US006810552B2

United States Patent
Miyake et al.

(10) Patent No.: US 6,810,552 B2
(45) Date of Patent: Nov. 2, 2004

(54) CLEANING TOOL FOR OPTICAL CONNECTOR

(75) Inventors: Taisei Miyake, Tokyo (JP); Ai Fukuhara, Tokyo (JP); Hitoshi Goto, Tokyo (JP); Kazuya Sawa, Tokushima (JP); Kiyoshi Nara, Tokushima (JP)

(73) Assignee: NTT Advanced Technology Corporation, Tokyo (JP)

( * ) Notice: Subject to any disclaimer, the term of this patent is extended or adjusted under 35 U.S.C. 154(b) by 291 days.

(21) Appl. No.: 10/109,739

(22) Filed: Mar. 28, 2002

(65) Prior Publication Data

US 2002/0166190 A1 Nov. 14, 2002

(30) Foreign Application Priority Data

Apr. 11, 2001 (JP) ........................................ 2001/112654

(51) Int. Cl.⁷ ........................ B08B 9/023; B08B 25/00
(52) U.S. Cl. ................ 15/210.1; 15/104.001; 15/104.04; 15/209.1
(58) Field of Search ............................ 15/209.1, 210.1, 15/211, 104.001, 104.04

(56) References Cited

U.S. PATENT DOCUMENTS

| 4,263,692 A | * | 4/1981 | Gremillion ................. 15/210.1 |
| 4,637,089 A |   | 1/1987 | Schwarz |
| 4,785,586 A | * | 11/1988 | Kratfel ........................ 451/552 |
| 5,925,191 A | * | 7/1999 | Stein et al. ..................... 134/6 |
| 6,449,795 B1 |  | 9/2002 | Sato |
| 2001/0033728 A1 | | 10/2001 | Miyake et al. |

FOREIGN PATENT DOCUMENTS

| EP | 0391 111 | 10/1990 |
| JP | 63279207 | 11/1988 |
| JP | 2000-314822 | 11/2000 |
| JP | 200219421 | 8/2002 |

* cited by examiner

*Primary Examiner*—Randall Chin
(74) *Attorney, Agent, or Firm*—Blakely Sokoloff Taylor & Zafman

(57) ABSTRACT

A cleaning tool for an optical connector includes a cylindrical cleaner and a holding member for holding a proximal portion of the cleaner. The cleaner has a main body with a ferrule insertion hole extending from a ferrule insertion port at its distal end face toward the proximal end of the cleaner. The ferrule insertion hole has an inner diameter substantially the same as an outer diameter of a ferrule. The ferrule insertion hole is surrounded by a rough surface so as to clean an outer surface of the ferrule which is to be inserted.

4 Claims, 7 Drawing Sheets

CLEANING TOOL FOR OPTICAL CONNECTOR

BACKGROUND OF THE INVENTION

The present invention relates to a cleaning tool for an optical connector which cleans an optical connector for connecting optical fibers.

As optical communication or optical measurement using light has developed remarkably in recent years, the loss at the connecting portion of an optical connector for connecting optical fibers poses a problem.

In such an optical connector, optical fibers are generally connected to oppose each other. In this case, if the connecting end face of the optical connector is soiled or a substance such as fats and oils or dust attaches to it, the insertion loss of the optical fiber is increased to decrease the reflection attenuation amount, and an optical signal cannot be transmitted correctly. For this reason, the connecting end face of the optical connector must be cleaned periodically or when necessary to remove the soil or attaching substance.

Conventionally, when the connecting end faces of optical connectors are to be cleaned, the operator cleans the end faces by wiping them with a cleaning tool, e.g., a cleaning sheet or paper impregnated with ethyl alcohol, or spraying nitrogen gas to them. In the wiping cleaning operation using a cleaning sheet or paper impregnated with alcohol, the amount of alcohol to be used and the wiping degree change depending on the operator who performs cleaning, and the cleaning effect tends to vary. Since alcohol tends to catch fire easily, it must be handled and stored with sufficient care.

In view of this, a dry cleaning tool has recently been proposed to replace the wet cleaning tool described above. According to the dry cleaning tool, a cleaning cloth formed into a tape-like shape is urged and rubbed against a ferrule end face (connecting end face), thereby removing an attaching substance, e.g., a soil, dust, or oils and fats, attaching to the ferrule end face, particularly the coupling surface (end face) of an optical fiber which forms one plane together with the connecting end face.

FIGS. 9 and 10 show a dry cleaning tool for an optical connector previously filed by the present applicant. This cleaning tool 1 has a thin box-like case 2, and the structure shown in FIG. 10 is loaded in the case 2. This structure has a supply pulley 4 on which a tape-like cleaning sheet 3 is wound, a take-up pulley 5 for taking up the cleaning sheet 3, and a ratchet mechanism (not shown) for rotating the supply pulley 4 in only a predetermined direction (take-up direction) to prevent the cleaning sheet 3 from becoming loose.

Part of one side wall 2a along the long side of the case 2 has an open window 6 for exposing the cleaning sheet 3 to the outside, and a shutter 7 for opening/closing the open window 6. A rotary drive mechanism (not shown) for driving the supply pulley 4, a tape feed grip 8 for driving the rotary drive mechanism, and a pad 9 for receiving and supporting that sheet portion of the cleaning sheet 3 which is exposed from the open window 6 are built in the case 2.

FIG. 11 shows an example of an optical connector 10 to be cleaned by the cleaning tool 1 shown in FIGS. 9 and 10. This optical connector 10 has a plug body 11 and a ferrule 12 built in the plug body 11 and with a front end face (connecting end face) projecting from the front end face of the plug body 11. An optical fiber 13 is arranged at the center of the ferrule 12. While the optical fiber 13 is inserted in the ferrule 12, it is fixed with an adhesive or the like such that its coupling surface 13a as the distal end face forms one plane together with the connecting end face of the ferrule 12. In this state, the connecting end face of the ferrule 12 and the coupling surface 13a of the optical fiber 13 are mirror-surface polished.

When optical connectors 10 with this structure are employed, the coupling surfaces 13a of the optical fibers 13 are brought into contact with each other by engagement of an engaging portion 14 formed on the side surface of one plug body 11 and an engaging portion formed on the plug body of the mating optical connector. Hence, the plug bodies 11 are coupled to each other and an optical signal is transmitted. In this case, if the coupling surfaces 13a are soiled, or a substance such as dust or oils and fats attaches to them, light from the optical fiber 13 is absorbed to increase the insertion loss of the optical connectors 10, thereby decreasing the reflection attenuation amount. Consequently, the optical signal cannot be transmitted correctly.

When the connecting end face of the ferrule 12 in the optical connector 10 and the coupling surface 13a of the optical fiber 13 are to be cleaned by the cleaning tool 1, first, the user grips the tape feed grip 8. Then, the shutter 7 opens interlocked with the tape feed grip 8, to expose the cleaning sheet 3 to the outside from the open window 6. Also, the rotary drive mechanism (not shown) is driven to rotate the take-up pulley 5 in the take-up direction. Therefore, the supply pulley 4 feeds a predetermined amount of cleaning sheet 3, so that a new, unused sheet portion is supplied to the open window 6. In this state, when the connecting end face of the ferrule 12 of the optical connector 10 is urged and rubbed against the surface of the cleaning sheet 3 exposed from the open window 6, the substance such as a soil, dust, or oils and fats attaching to the coupling surface 13a of the optical fiber 13 is removed, thus cleaning the coupling surface 13a. After cleaning, when the user releases the holding state of the tape feed grip 8, the tape feed grip 8 is restored to the initial position by the force of a spring incorporated in the case 2, and the shutter 7 closes the open window 6.

With the conventional cleaning tool 1 described above, although the connecting end face of the ferrule 12 and the coupling surface 13a of the optical fiber 13 can be cleaned well by removing the attaching substance or soil from them, the side surface of the ferrule 12 cannot be cleaned at all. If a substance such as dust attaches to the side surface of the ferrule 12, or the optical connector 10 in a soiled state is mounted in a device or the like, the insertion loss is increased due to the attaching substance or soil on the side surface of the ferrule 12, and the reflection attenuation amount decreases. As a result, an optical signal cannot be transmitted correctly.

This will be described in more detail by means of a practical example. As shown in FIGS. 12 or 13, when sebum, dust, or a polishing liquid (containing diamond abrasive grains, $SiO_2$ crystals, alumina, or the like) attaches to the side surface of the ferrule 12, the optical fibers 13 to be connected are not connected such that their coupling surfaces do not oppose each other correctly, but the optical axes of the two optical fibers are tilted. Then, as shown in FIG. 14, the insertion loss increases in accordance with the degree of the tilt of the optical axes. This insertion loss is correlated not only to the tilt (angular shift) of the optical axes but also to the offset (misalignment) and gap. When an angular shift of 1° occurs, off-axis occurs simultaneously. Therefore, the insertion loss is the sum of the angular shift and misalignment. With dust or the like attaching to the side surface of the ferrule, when this ferrule is to be connected with another ferrule, if an angular shift occurs between the two ferrules, this leads to a very large influence. For example, with a misalignment of 0.5 mm, the connection loss becomes 0.1 dB. Generally, a connection loss at one connection point must be 0.2 dB or less. If misalignment occurs, as described above, an angular shift also occurs, and the connection loss at this time becomes 0.1 dB. Therefore, the sum of the connection loss becomes 0.2 dB, which is larger than the general requirement. Referring to FIGS. 12 and 13, reference numeral 1 denotes a split sleeve; 2, an adapter sleeve holder; 3, a ferrule; 4, dust; 5, a ferrule to which the dust attaches; 6, a precision sleeve; 7, dust; 8, a lens; and 9, a display such as a CRT.

SUMMARY OF THE INVENTION

The present invention has been made to solve the conventional problems described above, and has as its object to provide an optical connector cleaning tool which can reliably clean the side surface of a ferrule so as to decrease the connection loss caused by dust or the like at the optical connector portion, has a simple structure and a smaller number of components, and is inexpensive and easy to use.

It is another object of the present invention to provide an optical connector cleaning tool which improves the operation efficiency for the side surface of a ferrule and has a stable cleaning ability.

In order to achieve the above objects, according to the present invention, there is provided a cleaning tool for an optical connector, comprising a cylindrical cleaner and a holding member for holding a proximal portion of the cleaner, the cleaner having a main body with a ferrule insertion hole extending from a ferrule insertion port at a distal end face thereof toward the proximal end of the cleaner and having an inner diameter substantially the same as an outer diameter of a ferrule, and the ferrule insertion hole being surrounded by a rough surface so as to clean an outer surface of the ferrule which is to be inserted.

In this case, the main body of the cleaner is made of either one of ultra-fine fiber, urethane, and rubber.

The inner wall surface of the main body of the cleaner and that of the plug form rough surfaces so that they can clean the end faces of the ferrule and optical fiber and the side surface (more precisely the capillary portion) of the ferrule.

These rough surfaces are formed by processing ultra-fine fiber, urethane, or rubber.

DESCRIPTION OF THE PREFERRED EMBODIMENTS

The preferred embodiments of the present invention will be described in detail with reference to the accompanying drawings.

Figure 1:
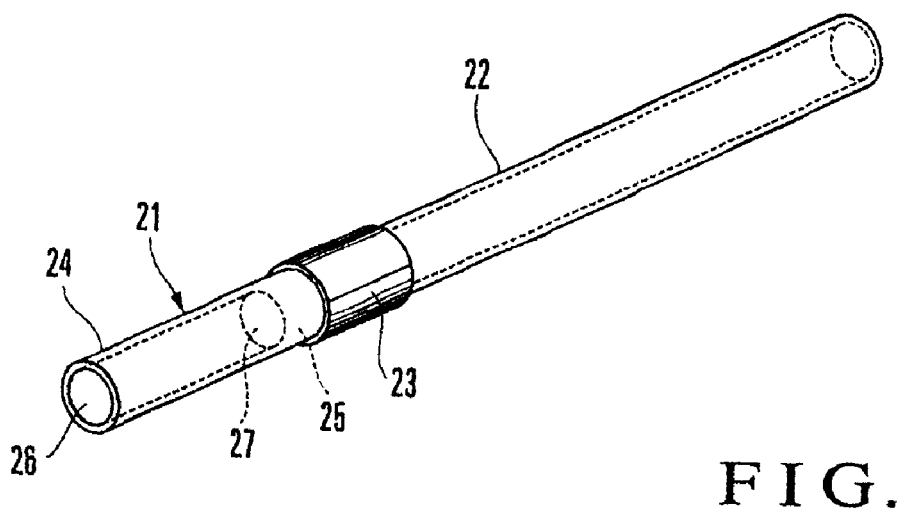
FIG. 1 is a perspective view showing a cleaning tool for an optical connector according to the first embodiment of the present invention.
Figure 2:
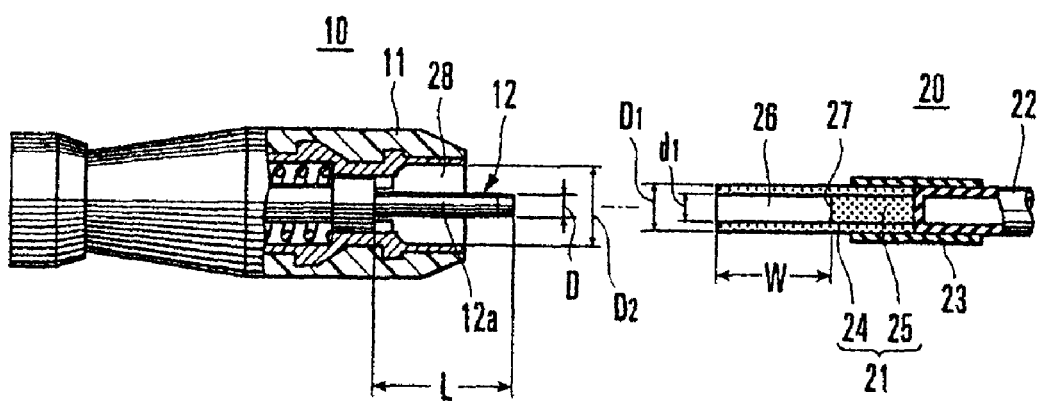
FIG. 2 is a view showing how cleaning is performed using this cleaning tool.

FIGS. 1 and 2 show a cleaning tool for an optical connector according to the first embodiment of the present invention. Referring to FIGS. 1 and 2, a cleaning tool for an optical connector which is entirely indicated by reference numeral 20 is comprised of a cleaner 21 and a holding member 22 connected to the cleaner 21 with a fixing means 23.

The cleaner 21 is comprised of a cylindrical main body 24 and a plug 25 inserted and fitted in the main body 24. The main body 24 is formed cylindrically by winding a thin cloth, formed by weaving ultra-fine fiber (e.g., polyester) with a size of, e.g., about 0.1 denier, a predetermined number of times, and adhering the cloths of the respective layers with each other with an adhesive, and has a ferrule insertion hole 26 in its distal end. This main body 24 can be easily fabricated by winding a thin cloth on a thin, elongated rod a plurality of number of times, bonding it with an adhesive, thereafter removing the rod. Alternatively, this main body 24 can be easily fabricated by winding a thin cloth on the plug 25 a predetermined number of times and bonding it with an adhesive.

According to another fabricating method, a thin ultra-fine-fiber cloth is put on a straw-like rod. A round rod is inserted into the opening of the straw-like rod for a desired length from the distal end. The round rod is removed, and the end face of the cloth on the outer portion of the straw-like rod is fixed with an adhesive or with a heat-shrinkable capillary tube or the like. In this manner, the main body 24 can be formed easily. In the fabrication, it is desirable that the cut surfaces of the ultra-fine fiber do not come into contact with a ferrule 12. This is to prevent the ultra-fine fiber from separating from the cut surfaces to attach to the ferrule 12.

The plug 25 is formed by winding an ultra-fine-fiber cloth made of the same material as that of the main body 24 into a columnar shape, and is fixed to the inner surface on the proximal end side (holding member 22 side) of the main body 24 with an adhesive or the like. A hollow portion extending from the inner end face of the plug 25 to the distal end-side opening of the main body 24 (ferrule insertion port) forms the ferrule insertion hole 26. More specifically, the ferrule insertion hole 26 is formed of a blind hole which opens to the distal end face of the main body 24. An inner wall 27 on the ferrule insertion hole 26 side of the plug 25 defines a depth W of the ferrule insertion hole 26. In other words, the plug 25 constitutes a distal-end cleaning member that cleans the connecting end face of the ferrule and the coupling surface of the optical fiber.

Figure 10:
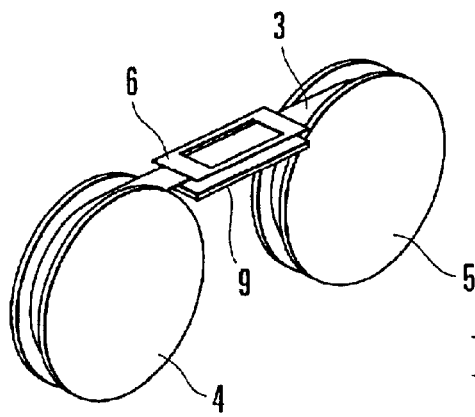
FIG. 10 is a perspective view showing a cleaning sheet and reels extracted from the cleaning tool.

An outer diameter $D_1$ of the cleaner 21 is set to be larger than an outer diameter D of the ferrule 12 of an optical connector 10 which is to be cleaned ($D_1 > D$). A diameter $d_1$ of the ferrule insertion hole 26 is almost equal to the outer diameter of the ferrule 12. More specifically, the diameter $d_1$ of the ferrule insertion hole 26 is set to be equal to or slightly larger than the outer diameter D of the ferrule 12 ($d_1 >= D$) in order to enable insertion of the ferrule 12. The depth W of the ferrule insertion hole 26 is set to be smaller than a length L (e.g., about 10 mm) of a capillary portion 12a of the ferrule 12 (W<L). In other words, the depth W of the ferrule insertion hole 26 suffices as far as the distal end of the ferrule 12 can be cleaned sufficiently. This enables a connecting end face 12a of the ferrule 12 and a coupling surface 13a of the optical fiber (FIG. 10) to come into reliable contact with the inner wall 27 of the plug 25 serving as the terminal end wall of the ferrule insertion hole 26.

The holding member 22 is formed of a metal, a plastic, or the like into a cylinder (or round rod) with one closed end. The proximal end of the cleaner 21 is brought into tight contact with the closed end face of the holding member 22 such that their axes substantially coincide, and is fixed by the fixing means 23. As the fixing means 23, an adhesive (pressure-sensitive adhesive) tape, a heat-shrinkable tube, or the like is used. In this case, the fixing means 23 can alternatively be an adhesive itself.

The optical connector 10 has a plug body 11 and ferrule 12. The ferrule 12 is built into a ferrule housing hole 28 formed in the front surface of the plug body 11, so its distal end projects from the plug body 11 forward. The ferrule housing hole 28 has a diameter $D_2$ sufficiently larger than the outer diameter D of the ferrule 12. A stopper 29 is formed at the proximal portion of the ferrule 12.

When the optical connector 10 is to be cleaned by using this cleaning tool 20, the ferrule 12 is inserted into the ferrule insertion hole 26 from the ferrule insertion port of the cleaner 21, and its side surface (outer surface) is brought into contact with the inner surface of the cleaner 21. The holding member 22 is moved to and fro and rotated to rub the inner surface of the ferrule insertion hole 26 against the side surface of the ferrule 12. Hence, the cleaner 21 removes a substance, e.g., dust or oils and fats, and soils attaching to the side surface of the ferrule 12.

Figure 11:
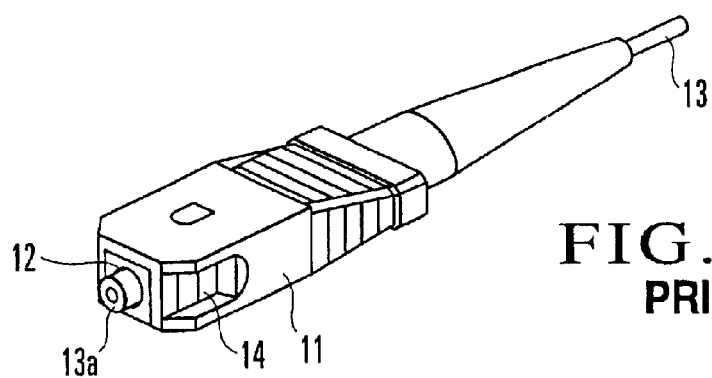
FIG. 11 is a perspective view of an optical connector.
Figure 12:
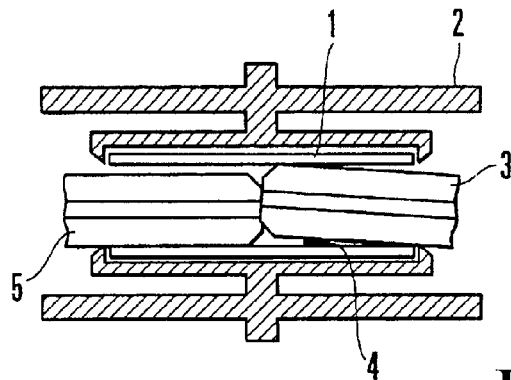
FIG. 12 is a sectional view showing a state wherein dust or the like attaches to the side surface of the ferrule of the optical connector.
Figure 13:
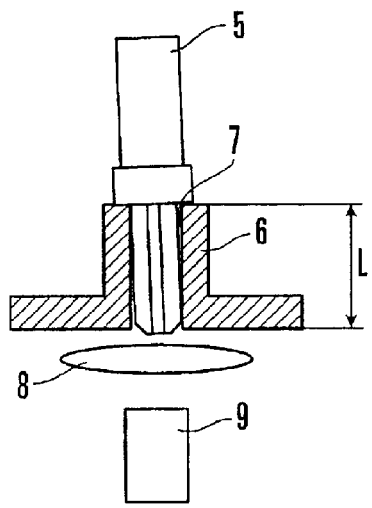
FIG. 13 is a view showing a state wherein a measurement unit for an optical connector with dust or the like attaching to the side surface of its ferrule is mounted.
Figure 14:
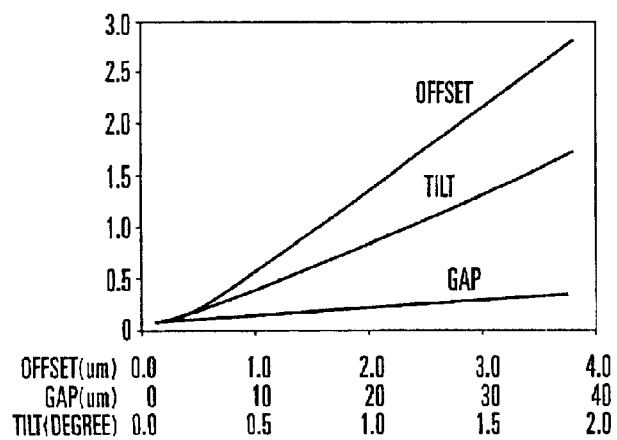
FIG. 14 is a graph showing the relationship among misalignment of the ferrules, tilt, gap, and insertion loss.

When the connecting end face of the ferrule 12 and the coupling surface 13a (FIG. 11) of the optical fiber 13 are to be cleaned, the ferrule 12 is inserted into the ferrule insertion hole 26 until its connecting end face comes into contact with the inner wall 27 of the plug 25. In this state, the connecting end face of the ferrule 12 is rubbed against the inner wall 27 or is rotated. Hence, the cleaner 21 removes a substance, e.g., dust or oils and fats, and soils attaching to the connecting end face of the ferrule 12 and the coupling surface 13a of the optical fiber 13.

The connecting end face of the ferrule 12 and the coupling surface 13a of the optical fiber 13 may naturally be cleaned simultaneously with the side surface of the ferrule 12.

Since such a cleaning tool 20 is of the dry type, it need not use alcohol that can catch fire easily, and can be handled and stored and managed easily. Since the cylindrical cleaner 21 need only be attached to the holding member 22, the structure of the cleaning tool 20 is very simple. Compared to the conventional cassette type cleaning tool 1 shown in FIGS. 8 and 9, the cleaning tool 20 has a considerably smaller number of components, can be fabricated at a low cost, has no portion that can cause a trouble, and can be used conveniently. Since the connecting end face of the ferrule 12, the coupling surface 13a of the optical fiber 13, and the side surface of the ferrule 12 can be cleaned simultaneously by one cleaning operation, cleaning can be done within a short period of time, decreasing the burden to the operator.

Other embodiments of the present invention will be described with reference to FIGS. 3A and 3B to FIGS. 7A to 7D.

Figure 3A:
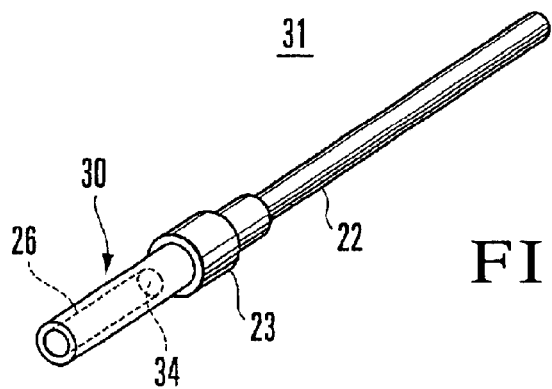
FIGS. 3A and 3B are an outer appearance perspective view and a sectional view, respectively, showing the second embodiment of the present invention.
Figure 3B:
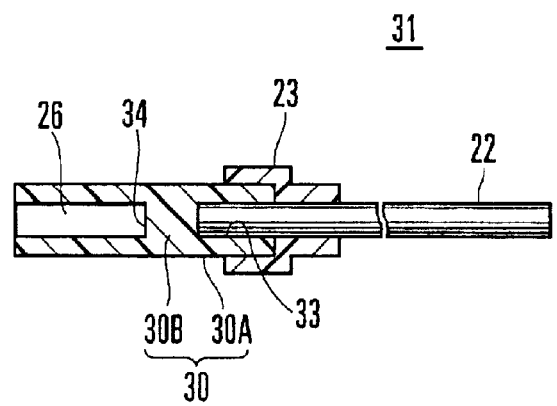

FIGS. 3A and 3B show the second embodiment of the present invention. In this embodiment, the distal end of a holding member 22 is fitted in one end of a cylindrical cleaner 30. In this state, the connecting portion between the cleaner 30 and holding member 22 is fixed by a fixing means 23 such as a heat-shrinkable tube or tape, thereby forming a cleaning tool 31.

This will be described in detail. The cleaner 30 is an integrally molded product constituted by a cylindrical main body 30A made of a synthetic resin such as urethane or rubber, and a partition wall 30B (corresponding to the plug 25 of the first embodiment shown in FIGS. 1 and 2) formed at the intermediate portion of the main body 30A. A hollow portion on the front side of the partition wall 30B forms a ferrule insertion hole 26, and a hollow portion on the rear side of the partition wall 30B forms a fitting hole 33 for the holding member 22. An inner wall 34 of the partition wall 30B defines the depth of the ferrule insertion hole 26.

In the cleaning tool 31 with this structure, since the cleaner 30 is an integrally molded product constituted by the main body 30A and plug 30B made of a synthetic resin such as urethane or rubber, fabrication can be performed more easily at a lower cost than in the first embodiment.

Figure 4A:
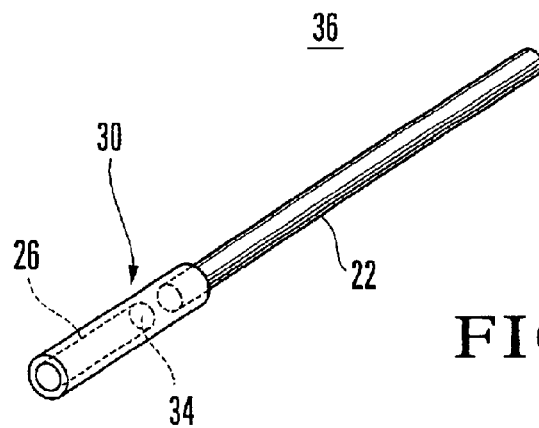
FIGS. 4A and 4B are an outer appearance perspective view and a sectional view, respectively, showing the third embodiment of the present invention.
Figure 4B:
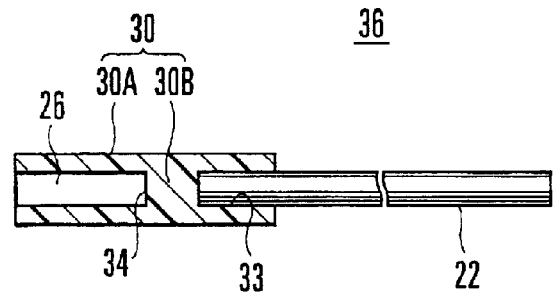

FIGS. 4A and 4B show the third embodiment of the present invention, which is a modification of the second embodiment described above. The distal end of a holding member 22 is fitted in a fitting hole 33 formed in a main body 30A of a cylindrical cleaner 30, and is fixed by thermal welding or with an adhesive. Except for this, the structure of the third embodiment is the same as that of the second embodiment described above.

With a cleaning tool 36 having this structure, the same effect as that of the second embodiment described above can be obviously obtained despite a smaller number of components.

Figure 5A:
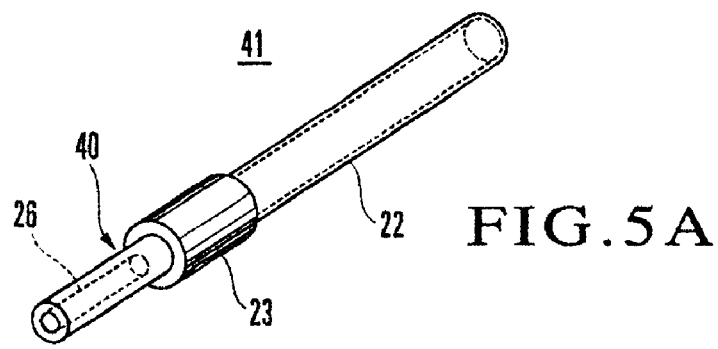
FIGS. 5A and 5B are an outer appearance perspective view and a sectional view, respectively, showing the fourth embodiment of the present invention.
Figure 5B:
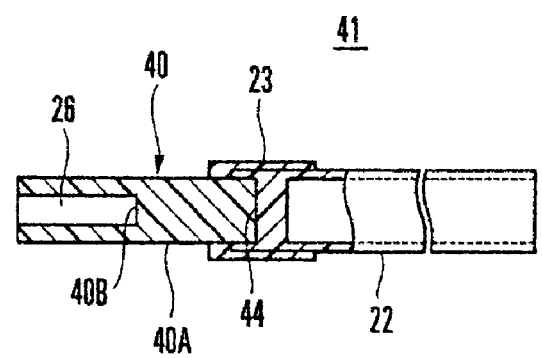

FIGS. 5A and 5B show the fourth embodiment of the present invention. According to the fourth embodiment, a cleaning tool 41 is constituted by a cleaner 40, holding member 22, and fixing means 23.

In the cleaner 40, a ferrule insertion port opens in one end of a rod-like main body 40A. A recess extends from the ferrule insertion port into the rod-like main body 40A, thus forming a ferrule insertion hole 26. An inner wall 40B serving as a plug in the same manner as in other embodiments is formed in the other end of the ferrule insertion hole 26.

The rod-like main body 40A of the cleaner 40 is made of a synthetic resin such as urethane or rubber, and the ferrule insertion hole 26 and the inner wall 40B serving as the plug are formed by molding.

According to the fourth embodiment, the cleaner 40 is connected to the holding member 22 through the fixing means 23. A recess 44 to fit on the cleaner 40 is formed in the distal end of the holding member 22, and the fixing means 23 is arranged to cover the connecting portion between the cleaner 40 and holding member 22. As the fixing means 23, a heat-shrinkable tube or tape used in the embodiments described above is used.

With the cleaning tool 41 having this structure, the same effect as those of the second and third embodiments described above can also be obviously obtained.

Figure 6A:
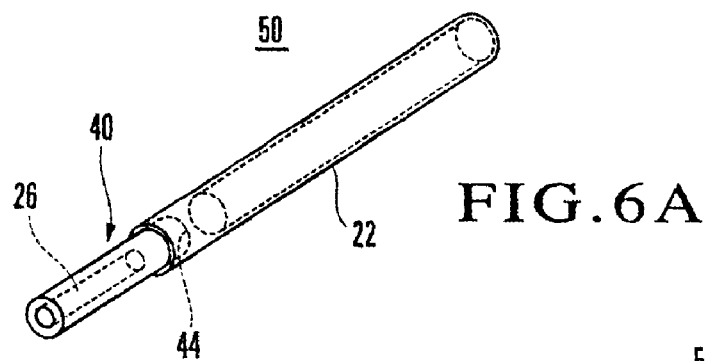
FIGS. 6A and 6B are an outer appearance perspective view and a sectional view, respectively, showing the fifth embodiment of the present invention.
Figure 6B:
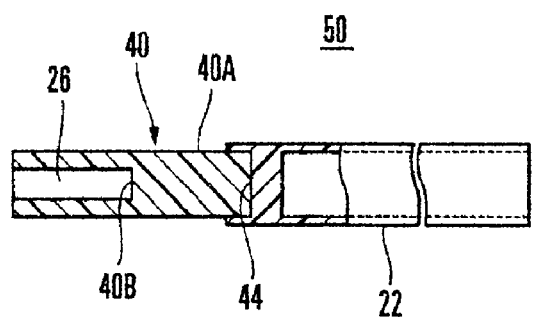

FIGS. 6A and 6B show the fifth embodiment of the present invention, which is a modification of the fourth embodiment described above. In a cleaning tool 50, a cylindrical cleaner 40 is fitted in a recess 44 formed in the distal end face of a holding member 22, and is fixed to it by heat welding or with an adhesive. Except for this, the structure of the fifth embodiment is the same as that of the fourth embodiment described above.

In the second to fifth embodiments in which the cleaner 30 or 40 is integrally formed of a synthetic resin such as urethane or rubber, the inner surface of the ferrule insertion hole 26 and the inner wall of the plug are preferably formed roughly so as to enhance the cleaning effect. Then, dust or the like attaching to the ferrule side surface of the optical connector is removed completely by inserting the ferrule into the ferrule insertion hole 26 from the ferrule insertion port of the cleaner 30 or 40, moving the ferrule or the cleaner 30 or 40 to and fro in the axial direction or rotating it, and thereafter extracting the cleaner 30 from the ferrule. The connecting end face of the ferrule and the coupling surface of the optical fiber are naturally cleaned by the other end of the ferrule insertion hole of the cleaner 30 or 40, in the same manner as in the embodiments described above.

FIGS. 7A to 7D respectively show cases wherein the inner surface of the ferrule insertion hole 26 is formed roughly.

Figure 7A:
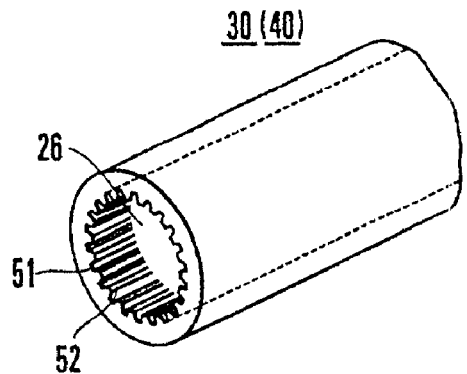
FIGS. 7A to 7D are views respectively showing cases wherein the inner surface of a ferrule insertion hole is formed roughly.
Figure 7B:
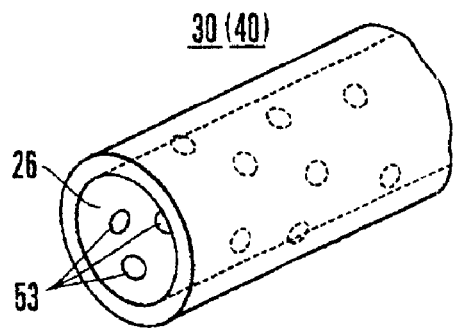
Figure 7C:
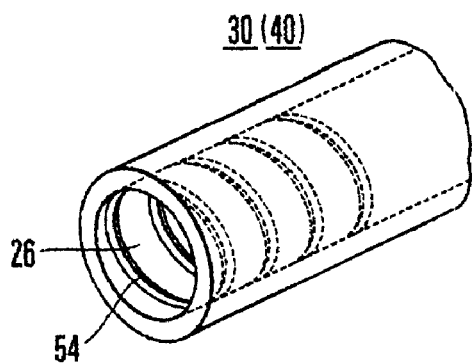
Figure 7D:
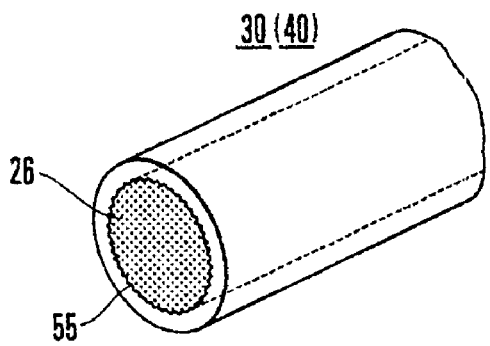

FIG. 7A shows a case wherein grooves 51, elongated in the axial direction of a cleaner 30 (40), and ridges 52 are alternately formed on the inner surface of a ferrule insertion hole 26. FIG. 7B shows a case wherein semispherical projections 53 with a diameter of 2 mm or less are randomly formed on the inner surface of a ferrule insertion hole 26. FIG. 7C shows a case wherein spiral ridges 54 are formed on the inner surface of a ferrule insertion hole 26. FIG. 7D shows a case wherein small recesses and projections 55 of 0.5 mm or less are randomly formed on the inner surface of a ferrule insertion hole 26.

Figure 8A:
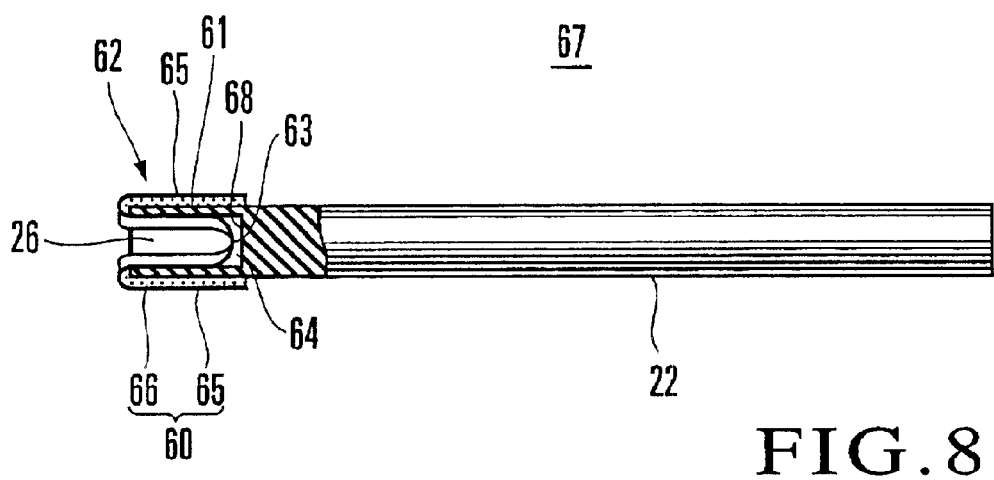
FIG. 8A is a partly cutaway front view of the sixth embodiment of the present invention.
Figure 8B:
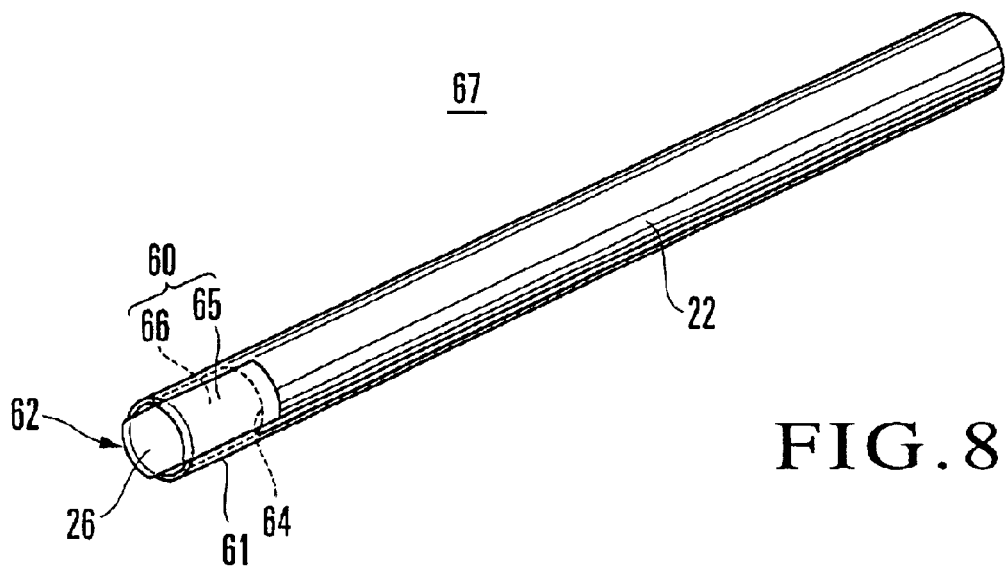
FIG. 8B is an outer appearance perspective view of the same.
Figure 9:
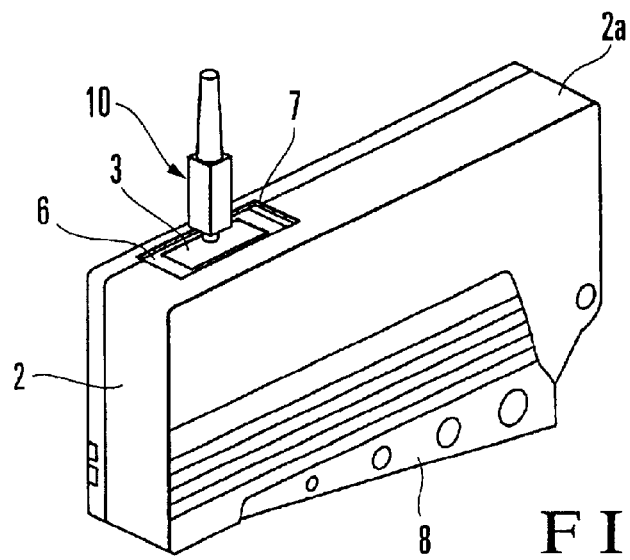
FIG. 9 is a perspective view showing a conventional cassette-like cleaning tool.

FIGS. 8A and 8B show part of the sixth embodiment of the present invention in section. A cleaning tool 67 shown in the sixth embodiment is integrally formed of a cleaner 60 and holding member 22. This will be described in detail. In the cleaner 60, that portion with a recess 64 which is formed in one end of the holding member 22 constitutes a main body 61, and a bottom portion inner wall 68 of the recess 64 corresponds to the plug of the embodiments described above. A cleaning cloth 62 covers the inner wall surface and the bottom portion inner wall 68 of the recess 64. More specifically, the cleaning cloth 62 is formed of ultra-fine fiber into a strip, and its central portion is pushed into the recess 64 to form a U-shaped bent portion 63. In this case, the distal end of the bent portion 63 may be in contact with the bottom portion inner wall 68 of the recess 64, or may be slightly separate from it, as shown in FIG. 8A. Two ends 65 of the cleaning cloth 62 are adhered to the outer surface of the main body 61 with an adhesive 66. That portion of the cleaning cloth 62 which is inserted in the recess 64 forms a ferrule insertion hole 26. The U-shaped bent portion 63 of the cleaning cloth 62 constitutes a distal end cleaning member for the connecting end face of the ferrule and for the coupling surface of the optical fiber.

An example of how to arrange the cleaning cloth 62 described above in the recess 64 of the main body 61 will be described. The central portion of the strip-like cleaning cloth 62 is inserted with a thin rod, and the two ends 65 of the cleaning cloth 62 which are not housed in the recess 64 are fixed to the outer surface of the main body 61 (the distal end of the holding member 22) with the adhesive 66, thereby forming the ferrule insertion hole 26. When the central portion of the cleaning cloth 62 is to be pushed into the recess 64, the adhesive may be applied to the inner surface of the ferrule insertion hole 26 and the bottom portion inner wall 68 in advance, and the U-shaped bent portion 63 of the cleaning cloth 62 may be fixed there.

In the cleaning tool 67 with this structure, an ultra-fine-fiber cloth may be cut into a strip to form the cleaning cloth 62, and the central portion of the cleaning cloth 62 may be pushed into the recess 64, formed in one end of the holding member 22, such that it is bent in a U shape. Therefore, the cleaning tool 67 can be formed easily at a low cost.

The cleaning tool for the optical connector according to the present invention is desirably stored with its cleaner 21 (30, 40, 52) being covered with an appropriate cap, so dust or the like will not attach to it while it is not in use.

As has been described above, with the cleaning tool for the optical connector according to the present invention, not only the connecting end face at the distal end of the ferrule and the coupling surface of the optical fiber, but also the side surface of the ferrule which is difficult to clean with an existing cleaning tool can be cleaned reliably. The insertion loss of the optical connector caused by a substance attaching to the side surface of the ferrule or a soil can be decreased to be lower than in the prior art. With the cleaning tool for the optical connector according to the present invention, not only the side surface of the ferrule but also the connecting end face of the ferrule and the coupling surface of the optical fiber can be cleaned simultaneously. Hence, the time required for cleaning can be shortened. This cleaning tool has a very simple structure and a small number of components, so that not only it can be handled easily but can also be fabricated at a low cost. Furthermore, the cleaner formed by the ultra-fine fiber can reliably remove fine dust or an attaching substance such as oils and fats by absorbing it in the fiber, thereby increasing the cleaning effect.

What is claimed is:

1. A cleaning tool for a ferrule of an optical connector, comprising:

a cylindrical cleaner having a proximal end portion, a main body, and a distal end face;

a holding member for holding said proximal end portion;

said main body including a ferrule insertion hole including a proximal portion, said insertion hole extending from a ferrule insertion port at said distal end face thereof toward the proximal end portion and having an inner diameter substantially the same as an outer diameter of a ferrule to be inserted, and the ferrule insertion hole being surrounded by a rough surface so as to clean an outer surface of the ferrule which is to be inserted;

a distal end cleaning member for cleaning a connecting end face and a coupling surface of an optical fiber of the ferrule to be inserted, said distal end cleaning member arranged near said proximal portion of the ferrule insertion hole.

2. A cleaning tool according to claim 1, wherein said ferrule has a capillary portion having a distal end and a length from the ferrule insertion port of the main body to the distal end cleaning member for cleaning the connecting end face of the ferrule and the coupling surface of the optical fiber is set to be sufficient for said distal end of said capillary portion of the ferrule of the optical connector to come into contact with the cleaning member.

3. A cleaning tool according to claim 1, wherein the main body is made of one of ultra-fine fiber, urethane, and rubber.

4. A cleaning tool according to claim 1, wherein the main body is an ultra-fine fiber formed into a cylindrical shape.

* * * * *